Patented Jan. 3, 1928.

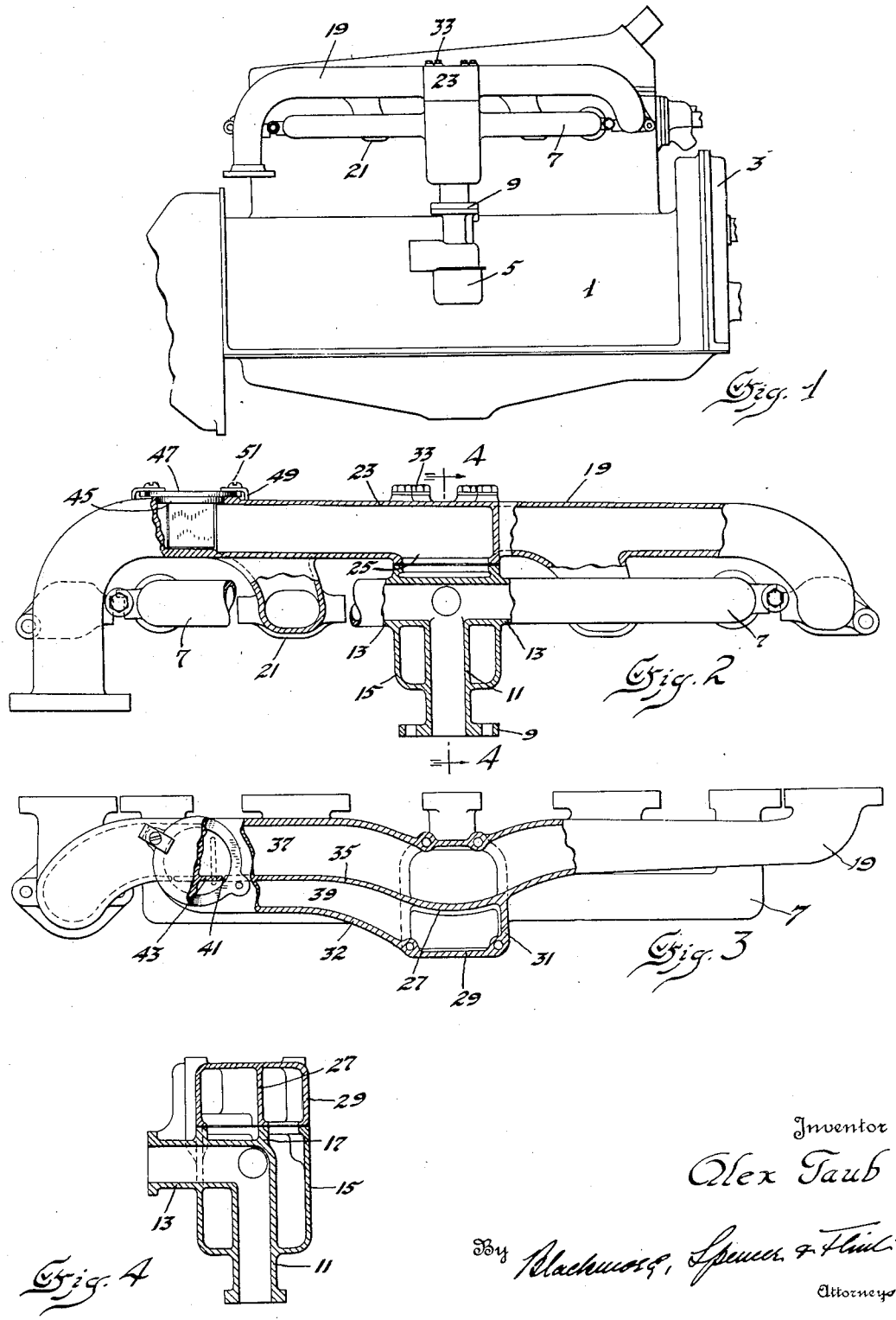

1,655,170

UNITED STATES PATENT OFFICE.

ALEX TAUB, OF DETROIT, MICHIGAN, ASSIGNOR TO GENERAL MOTORS CORPORATION, OF DETROIT, MICHIGAN, A CORPORATION OF DELAWARE.

INTAKE HEATER.

Application filed May 28, 1926. Serial No. 112,296.

This invention relates to internal combustion engines and to the fuel system thereof.

It is well known that in cold weather fuel does not readily vaporize and many arrangements have been made to heat the same, some of these arrangements employing the heated gases passing through the exhaust manifold. My invention also is directed to the heating of the incoming gases by the gas passing through the exhaust manifold.

An object of the invention is to provide a mechanism for heating the gas mixture as it passes from the carburetor to the gas engine.

More specifically, the invention employs a special exhaust manifold with a secondary conduit, and a valve so positioned that the explosive mixture may or may not be heated by the gases in the exhaust manifold.

For a full understanding of the invention reference is made to the following description and to the accompanying drawing.

In the drawing:

Figure 1 is a side view of an internal combustion engine equipped with my improvement.

Figure 2 is a side elevation of the manifold construction, parts being cut away and sectioned.

Figure 3 is a plan view, with parts cut away.

Figure 4 is a vertical section on line 4—4 of Figure 2.

Referring by reference characters to the drawing, numeral 1 is used to designate the internal combustion engine as a whole, 3 being the timing gear casing, 5 the carburetor and 7 the intake manifold. At its lower end the manifold is provided with flanges 9 cooperating with similar flanges on the carburetor, the flanges being connected together in the usual manner.

The intake manifold consists of a vertical tube 11 having horizontal branches as at 13 leading to the several cylinders. At the junction of the vertical tube 11 with the horizontal branches the manifold is formed with a chamber 15 through which the several manifold parts extend. In addition to the bottom, front, rear and sidewalls of the manifold chamber 15 there is an internal wall 17 positioned above the elbow of conduit 11 and extending lengthwise of the engine. This wall 11 extends upwardly to the upper surface of the manifold chamber as defined by the outer walls. The top of chamber 15 is open as shown in the drawing.

The exhaust manifold is designated by numeral 19. It has usual outlets 21 for connection with the cylinders of the engine block.

At an intermediate portion the exhaust manifold is enlarged as at 23 to form a chamber having a bottom opening 25. The chamber is formed with an inner wall 27 extending lengthwise. Numerals 39 and 31 represent the front and side walls of the enlargement. The dimensions of the enlargement are such that it fits against the open ends of the intake manifold, as clearly shown in Figure 4, bolts 33 being used to secure the parts together. When so positioned it will be seen that wall 27 joins wall 17.

At the rear of the exhaust manifold enlargement the wall is not extended directly back, but is extended rearwardly at 32 where it merges into the wall of the manifold. There is thus formed an intermediate wall 35 producing a main exhaust passage 37 and a secondary passage 39. Passage 39 communicates with the main portion through an opening 41 in the wall of the main portion. This opening is controlled by a valve 43 which may close the opening, as shown in Figure 3, or may be turned so as to afford a passage through said opening and to simultaneously close the main conduit 37. For operating purposes, the valve is made rigid with a disc 45 fitting rotatably a circular opening in the manifold, and having an enlarged circular disc 47 resting upon the outer surface of the manifold, where it is held in an adjusted position by clips 49 and screws 51.

It will be observed that when the valve is positioned to close the opening at the junction of the main and secondary conduits of the exhaust manifold, the exhaust gases follow the line of least resistance and pass through the main channel of the manifold without heating the incoming mixture from the carburetor. If the valve is turned to close the main passage and open the secondary passage the exhaust gases will find their way downwardly to the rear of partitions 27 and 17, then upwardly on the front side of said partitions and out through the secondary conduit 39 and the open valve. In its passage the hot gases from the cylinders will heat the gas mixture in the intake conduits on its way from the carburetor to the cylinders and thus aid in its vaporization. This is, of course, of special utility in cold weather. The adjustment from the winter to summer setting is easily made by merely loosening the two screws 51 and turning the valve.

I claim:

1. In an internal combustion engine, an intake manifold having a heating chamber at one portion, a separate exhaust manifold comprising a main conduit in open communication with one portion of said intake heater opening, and a second conduit, one end of said second conduit having a valved communication with said main conduit, the other end of said second conduit being in communication with a second portion of said intake manifold heating chamber opening.

2. In a heater for internal combustion engines, an intake manifold having a chamber surrounding a part of the fuel conduit, an exhaust manifold having a chamber registering therewith, registering lengthwise partitions in said chambers, the exhaust manifold being formed with a second conduit external to its main conduit and affording communication between said chamber of the exhaust manifold at one side of the division partition and an opening in the wall of the exhaust manifold proper, and a valve for said opening.

3. In a heater for internal combustion engines, an exhaust manifold, an intake manifold, the intake manifold having an enlargement surrounding a part of the fuel conduit, the enlargement having an open upper end divided by a longitudinal wall, an exhaust manifold having an enlarged portion, its opening registering with the open upper end of the enlarged portion of the intake manifold, a longitudinal wall registering with the similar wall of the intake manifold, the exhaust manifold also including as an integral part thereof, a conduit external to the manifold proper, affording communication between a portion of the enlarged part of the manifold at one side of the partition and an opening in the wall of the manifold proper, and a valve controlling said opening.

4. A heating device for fuel comprising an intake manifold including a heating chamber, an exhaust manifold, said chamber and exhaust manifold having registering openings, said exhaust manifold having a main conduit, and for a part of its length a secondary conduit, a valve at the junction of said conduits whereby the exhaust gases may pass through the main conduit when the junction is closed and whereby, when the valve closes the main passage, the exhaust gases pass through the intake heating chamber and thence through the secondary conduit and the open valve.

In testimony whereof I affix my signature.

ALEX TAUB.